US009767603B2

United States Patent
Schuldt et al.

(10) Patent No.: US 9,767,603 B2
(45) Date of Patent: Sep. 19, 2017

(54) METHOD AND DEVICE FOR PROCESSING 3D IMAGE DATA

(71) Applicant: Bayerische Motoren Werke Aktiengesellschaft, Munich (DE)

(72) Inventors: Michael Schuldt, Unterschleissheim (DE); Tilmann Ochs, Munich (DE); Timo Lotterbach, Neufahrn (DE); Sven Von Beuningen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 55 days.

(21) Appl. No.: 14/811,063

(22) Filed: Jul. 28, 2015

(65) Prior Publication Data

US 2015/0332499 A1  Nov. 19, 2015

Related U.S. Application Data

(63) Continuation of application No. PCT/EP2014/051576, filed on Jan. 28, 2014.

(30) Foreign Application Priority Data

Jan. 29, 2013 (DE) .................. 10 2013 201 377

(51) Int. Cl.
*G06T 17/00* (2006.01)
*G06T 15/00* (2011.01)
(Continued)

(52) U.S. Cl.
CPC .............. *G06T 17/00* (2013.01); *G06T 11/60* (2013.01); *G06T 15/005* (2013.01); *G06T 15/80* (2013.01);
(Continued)

(58) Field of Classification Search
CPC .......................... G06T 15/503; G06F 3/1438
(Continued)

(56) References Cited

U.S. PATENT DOCUMENTS 5,764,139 A   6/1998  Nojima et al.
6,664,959 B2 * 12/2003  Duluk, Jr. .............. G06T 1/60
                                                             345/421
(Continued)

FOREIGN PATENT DOCUMENTS

DE   10 2009 048 843 A1   4/2011

OTHER PUBLICATIONS

International Search Report (PCT/ISA/210) dated Jun. 4, 2014, with English translation (Six (6) pages).
(Continued)

*Primary Examiner* — Thomas Lett
(74) *Attorney, Agent, or Firm* — Crowell & Moring LLP

(57) ABSTRACT

In order to process 3D input image data for a display of images on at least one display unit, the 3D input image data are provided scene-by-scene in accordance with an associated 3D image scene. The 3D input image data are each fed to a scene processing unit for management and processing. The 3D input image data are processed scene-by-scene in the scene processing unit, wherein at least two 3D image scenes are at least partially superposed and a whole 3D scene is formed and managed. Several 3D output scenes are derived from the whole 3D scene, for which 3D output scenes the superposition occurs in accordance with different perspective locations of observation and 3D output image data are produced in the process. The 3D output image data are fed to at least one rendering unit, which is associated with the display unit, for the production of target image data adapted to the display unit.

20 Claims, 4 Drawing Sheets

(51) Int. Cl.
*G06T 11/60* (2006.01)
*G06T 15/80* (2011.01)

(52) U.S. Cl.
CPC ...... *G06T 2200/04* (2013.01); *G06T 2215/16* (2013.01)

(58) Field of Classification Search
USPC .......................................................... 345/426
See application file for complete search history.

(56) References Cited

U.S. PATENT DOCUMENTS

| | | | |
|---|---|---|---|
| 6,803,912 B1 | 10/2004 | Mark et al. | |
| 7,113,183 B1* | 9/2006 | Collins | G06T 15/503 |
| | | | 345/419 |
| 7,145,562 B2 | 12/2006 | Schechter et al. | |
| 7,836,086 B2 | 11/2010 | Gregory et al. | |
| 8,319,825 B1 | 11/2012 | Urbach | |
| 2008/0081701 A1 | 4/2008 | Shuster | |
| 2010/0070859 A1 | 3/2010 | Shuster et al. | |
| 2011/0078801 A1 | 3/2011 | Bae | |
| 2011/0157193 A1* | 6/2011 | Boucher | G06F 3/1438 |
| | | | 345/505 |
| 2011/0227938 A1 | 9/2011 | Lan et al. | |
| 2012/0019522 A1 | 1/2012 | Lawrence et al. | |
| 2012/0139906 A1 | 6/2012 | Zhang et al. | |
| 2014/0132629 A1* | 5/2014 | Pandey | G02B 27/0172 |
| | | | 345/633 |

OTHER PUBLICATIONS

German Search Report dated Mar. 7, 2013, with English translation (Nine (9) pages).

Kumar, et al., "Second Life and the New Generation of Virtual Worlds", Computer, IEEE, US, vol. 41, No. 9, 2008, pp. 46-53, XP011234228 (Eight (8) pages).

* cited by examiner

METHOD AND DEVICE FOR PROCESSING 3D IMAGE DATA

CROSS REFERENCE TO RELATED APPLICATIONS

This application is a continuation of PCT International Application No. PCT/EP2014/051576, filed Jan. 28, 2014, which claims priority under 35 U.S.C. §119 from German Patent Application No. 10 2013 201 377.9, filed Jan. 29, 2013, the entire disclosures of which are herein expressly incorporated by reference.

BACKGROUND AND SUMMARY OF THE INVENTION

The invention relates to a method and an apparatus for processing 3D image data. In particular, the invention relates to methods and systems in which objects are described in three-dimensional (3D) representation with so-called 3D image data.

By way of example, motor vehicles include microprocessor-controlled systems on which applications are executed that generate 3D image data. To this end, each application builds a separate so-called scene model that describes a 3D scene. In order to represent the 3D scene on a display unit, so-called renderers are used. Said systems can likewise be executed on a microprocessor, in particular on a computer. They substantially serve for processing the 3D image data of the 3D scene such that they are suitable for representation on the display unit.

During a rendering process, for example, an image can be computed from a 3D scene. During the conversion of 3D image data which describe a vector graphic, it is possible in the course of the rendering process for example to convert the vector graphic of an object into an image-point-wise pixel representation of the object in a two-dimensional (2D) computer graphic.

A 3D renderer can, for example, generate a separate 2D graphic from each individual 3D scene. By way of a control component, a so-called layer manager, it is possible to produce a total image for the display on a display unit by superposing different 2D graphics. Here, the individual 2D images are placed one above the other according to a fixed sequence in the form of planes. Contents from a higher plane can here cover contents from a lower plane. For the topmost plane, the visibility of its contents can be ensured.

Owing to such an architecture or data processing based on planes, 3D contents of different applications can be displayed on a common display. It is also possible to ensure here that contents of a safety-relevant application are represented on the display, that is to say that they are not covered by contents of other, non-safety-relevant applications.

FIG. 1 illustrates a corresponding image processing architecture. Here, three user programs run in a plurality of controllers or devices in a motor vehicle, that is to say a user program 1 for pedestrian detection in an onboard controller, a media player 2 in a multimedia system installed in the motor vehicle, and an e-mail application 3 in a smartphone that is temporarily connected in the vehicle. The application programs in each case generate image data that describe a 3D scene 4, 5 or 6. By way of example, it is possible to represent in the scene 4 the outline of a pedestrian, a photo produced by the media player in the scene 5, and an e-mail list in the scene 6. The scene image data are converted into 2D images in renderers 7, 8, 9 associated with the respective application programs. Here, planes are also associated with the application programs 1, 2, 3, wherein the image data 10 are associated with a topmost plane, the image data 11 with a central plane, and the image data 12 with a lower-most plane. A layer-manager application 13 receives the respective image data and superposes them plane-by-plane, with the topmost plane being superposed on all further underlying planes. This produces a 2D image 14, which is output by the layer manager 13.

A disadvantage of the described method of rendering each 3D scene separately and of superposition in a plane-wise manner at a later point is that no space-based coverages or optical effects such as reflections and shadows between elements of different 3D scenes can be computed. In addition, it is occasionally necessary for example in motor vehicles to display specific graphics contents spread over a plurality of display units, for example a first graphics portion in a main display unit in the region of the steering wheel, a second graphics portion in an infotainment system in the center console region, and a third graphics portion in a further infotainment system in the region of the rear seats. Individual graphics portions can here also be displayed in a plurality of display units at the same time. Such requirements are not sufficiently well met by the described plane-based approach.

U.S. Pat. No. 7,145,562 B2 discloses a system for representing two-dimensional and three-dimensional objects in a two-dimensional computer graphic, in which 2D objects and 3D objects can be integrated hierarchically in a common scene. The contents of this publication are hereby incorporated in the present description by reference.

When representing computer graphics, the generation and presentation of the finished image frequently take place in the same device. So as to enable an exchange of graphics contents beyond device limits, the graphics data are generally transmitted in predefined formats, so-called video streams. The video streams are here transmitted to a remote device via an interface and integrated here into the local scene. A disadvantage here is that determining interactions between remote and local scenes and realizing them in the target graphic is possible in most cases only with a high degree of complexity. For example, if objects that cast a shadow, which shadow is intended to be visible also on the objects in the local scene, are present in the transmitted video stream, it is necessary to exchange additional information between the two devices. It also requires a high degree of computing complexity during the production of the target graphic.

It is an object of the invention to allow superposition of images based on 3D input image data with a high degree of exactness and acceptable computing complexity.

This and other objects are achieved in accordance with emdoiments of the invention.

According to the invention, provision is made, for the purpose of processing 3D input image data for displaying images on at least one display unit, for the 3D input image data to be provided scene-by-scene in each case in accordance with an associated 3D image scene. The 3D input image data are each fed to a scene processing unit for management and processing and are processed scene-by-scene in the scene processing unit. Here, at least two 3D image scenes are superposed at least partially and a whole 3D scene is formed and managed. A plurality of 3D output scenes are derived from the whole 3D scene, in which 3D output scenes the superposition takes place in each case in accordance with a perspective viewing location and wherein 3D output image data are produced. The 3D output image data are fed to at least one rendering unit, which is associated with the display unit, for producing target image data that are adapted to the display unit.

The 3D input image data typically contain values for representing 3D objects, in particular 3D coordinate data and object attributes. A 3D scene can, in data-technological terms, be structured in particular via a scene tree or a scene graph. The 3D input image data can be made available in particular by a plurality of client-computer systems. The client-computer systems, the scene processing unit and the rendering unit can be microprocessor-controlled devices and/or be computer program applications loaded and running on such devices.

The invention is based on the finding that the forming of a whole 3D scene makes possible simplified and at the same time exact processing for deriving the 3D output image data from the different 3D input image data or from the 3D image scenes associated therewith. The invention is also based on the finding that the superposition of the 3D image scenes is advantageously possible from the whole 3D scene. Additionally it has been found that it is expedient to include a respective perspective viewing location in the formation of the 3D output image data when superposing from the whole 3D scene.

The perspective viewing location can be included as a camera parameter in the superposition, wherein possible camera parameters to be used are typical perspective parameters such as opening angle of the image scene or distance from the image scene. Camera parameters which can be provided by way of example are:

- a transformation matrix which describes the position and orientation of the camera in 3D space and describes the example position and/or relative viewing direction or point at which the camera is directed. In addition, a vector may be provided that indicates a preferential direction, for example the normal.
- opening angle in particular in the vertical direction
- aspect ratio of the target image, for example 16:9
- a so-called near-plane parameter which corresponds to the distance of the camera position from a projection surface, with all elements located in front of said surface not being visible in the target image.
- a so-called far-plane parameter which corresponds to the distance of the camera position from a surface that limits the camera space, with all elements located behind said surface not being visible in the target image.

If near-plane and far-plane parameters are used, a camera only records scene elements that are located between the near plane and the far plane. The surfaces of the planes result from the vertical opening angle, the aspect ratio and the respective value of the near plane or far plane.

The perspective viewing location or camera parameter can in each case correspond to the spatial position, alignment and/or other parameters of the at least one display unit. The display unit can be suitable for representing 3D images. It can also be configured for representing 2D images. Depending on the type of representation, the rendering unit converts the 3D output image data into 3D target image data or into 2D target image data. In the case of 2D target image data, the rendering unit is in particular a raster processor. A plurality of display units may be provided. Different perspective viewing locations or different camera parameters can be associated with different display units. In that case, for deriving the 3D output scenes from the whole 3D scene, the 3D image scenes can be superposed in each case according to the various perspective viewing locations or parameters. It is also possible for a plurality of rendering units to be provided, with which in each case one or a plurality of display units can be associated.

Owing to the globally managed whole 3D scene, the transmission of video streams can be omitted and graphics contents can be exchanged directly between different display units. The incorporation of additional display units is significantly simplified. It may suffice here to adapt in each case a small control portion in the respective system units, for example a small software portion, in order to include a new display unit in the display group consisting of a plurality of display units. It is additionally possible for any devices to contribute new graphics contents to the total scene. A display unit can in each case have a dedicated rendering unit that is physically fixedly connected therewith.

In each case one of at least two priority stages can be associated with the 3D input image data, with a priority stage in each case indicating to what degree the associated 3D image scene remains visible when superposed with another 3D image scene. The 3D output scenes can then be configured such that, when the target image data are produced in the rendering unit, those target image data that are derived from a 3D image scene of a higher priority stage are superposed at a target image coordinate on target image data that are derived from a lower priority stage. It thus becomes possible, for example, for safety-relevant image elements to be superposed on the display unit on other image elements that are not safety-relevant, i.e. to be displayed with a high degree of safety. By way of example, it is possible in a motor vehicle to ensure that the safety-relevant display relating to the level of a selected gear is superposed on the display unit on a non-safety-relevant display of navigation data. The association of the priority stages can take place 3D image scene for 3D image scene, in the scene tree and/or in the form of an attribute. It is additionally possible for provision to be made for, when image data which are characterized as safety-relevant are stored, in particular in the scene management unit and/or in the rendering unit, a memory write protection to take place, as a result of which unintended overwrite of the memory is prevented.

It is possible by way of the invention to process safety-relevant and non-safety-relevant 3D contents of different client-computer systems together in the scene processing unit and to produce therefrom a whole 3D scene with mixed contents. Here, on the one hand, safety-relevant 3D contents can be protected against unintended manipulations and against being covered by using the associated attributes. At the same time it is thereby possible to form a coherent whole 3D scene while taking into consideration coverages of 3D image scenes, optical effects and interactions between the 3D image scenes. It is thus possible with the invention to indicate a so-called mixed criticality system for image processing in particular in a motor vehicle.

In order to ensure that target image data relating to safety-relevant displays that are output by the rendering unit to the display unit are correctly represented there, it is possible to carry out a check by way of a check sum comparison of the two units.

In one advantageous exemplary embodiment of the invention, a plurality of display units are provided, with which in each case a rendering unit is associated. The scene processing unit can then produce for the display units in each case different 3D output image data, in particular as a partial scene or a so-called subscene, from the whole 3D scene, and the 3D output image data can be distributed in particular subscene-wise to one or more rendering units for producing the target image data. The distribution of the 3D output image data to a plurality of rendering units also makes it advantageously possible for a single display unit to distribute specific image data to a plurality of rendering units. As a result of such a distributed rendering process, it is then also possible to use a rendering unit of a first display unit that is less occupied for rendering 3D output image data of a second display unit, the rendering unit of which is highly occupied. This advantage can further be increased by associating the target image data, for example via the underlying 3D output image data and the associated perspective camera parameters, in each case with one display unit. The rendering unit can then output the target image data to the display unit that is in each case associated therewith.

If a plurality of rendering units are provided for the rendering process, a plurality of configurations and advantages can be achieved. For one, it brings about a certain failure safety, in which, if one rendering unit fails, a different rendering unit can assume the rendering tasks thereof. In addition, there is a scalability, in which the rendering performance can be increased owing to an additional rendering unit being provided, or by an available rendering unit which is less occupied assuming additional rendering tasks for a different rendering unit that is highly occupied. Furthermore, rendering tasks can be distributed with respect to the safety relevance between different rendering units. For example, one rendering unit together with a plurality of rendering units can be reserved for the respective 3D output image data that are characterized as safety-relevant or are associated with the highest priority stage. Said rendering unit can then provide for example memory write protection for the safety-relevant data.

In particular a bidirectional interaction can exist between the rendering unit and the scene management unit to the effect that the rendering unit transmits data relating to the perspective viewing locations to the scene management unit and vice versa that the scene management unit transmits the 3D output image data to the rendering unit. The data relating to the perspective viewing locations can in turn include corresponding data of the display unit, in particular coordinate data of the display unit, or be derived therefrom. In particular if a plurality of display units are present, it can thus be ensured that overlapping or coupled representations of an image scene are effected on different display units in a perspectively correct manner.

According to another advantageous embodiment of the invention, the scene processing unit uses, for the formation of the whole 3D scene, interaction parameters that describe an interaction between 3D image elements of at least two of the client-computer systems. As a result, it is possible to compute for example coverages of 3D image elements of the client-computer systems and represent them correctly in the display unit. Optical effects such as reflections and cast shadows between 3D image elements can also be computed advantageously by the scene processing unit from the whole 3D scene and be represented later on a display unit. Here, interaction parameters that can be used are for example latency parameters, transparency parameters or reflection coefficients that are associated with 3D image elements as attributes, or illumination parameters such as luminous intensity, color and light propagation direction from a light source that is associated with a 3D image scene or is present in the 3D image scene as a 3D image element. By way of example, the image of a pedestrian symbol, that is to be represented close to a set of traffic lights, can be periodically colored slightly yellow on the display unit of a motor vehicle due to the amber light of a flashing traffic light to be represented. An interaction between 3D image elements can be dynamic if the 3D image elements are in each case recomputed or represented on the display unit within a suitable dynamic period of for example one millisecond to 50 milliseconds. It is also possible to bring about animations thereby.

So-called deferred shading can preferably take place in the rendering unit, in which the rendering process takes place in stages, wherein the process can be completed early at predetermined processing stages at which target image data that can be output are present in the display unit and wherein successively a better image quality is achieved at in each case higher process stages.

For monitoring the rendering accuracy, it is furthermore possible to provide for a rendering of a predetermined reference image in parallel with the rendering of the 3D output image data, in particular of a reference pattern and/or a much smaller mini image, with respect to the image size, compared to the 3D output image data. A decision can then be made on the basis of the rendering result of the reference image as to whether the rendering result of the 3D output image data is used for the further processing or is discarded. For the mini or reference image, in particular a rendering data set can be used that is adapted to the respective rendering unit, to the 3D image scene and/or to the parameters associated therewith. For example, a mini image that is safety-relevant can be provided in each case for a 3D image element and/or a 3D image scene. It can be adapted to the respective 3D image element in terms of image processing relevance properties such as size, position, color, complexity and so on. A plurality of mini images can be provided for one 3D image scene.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
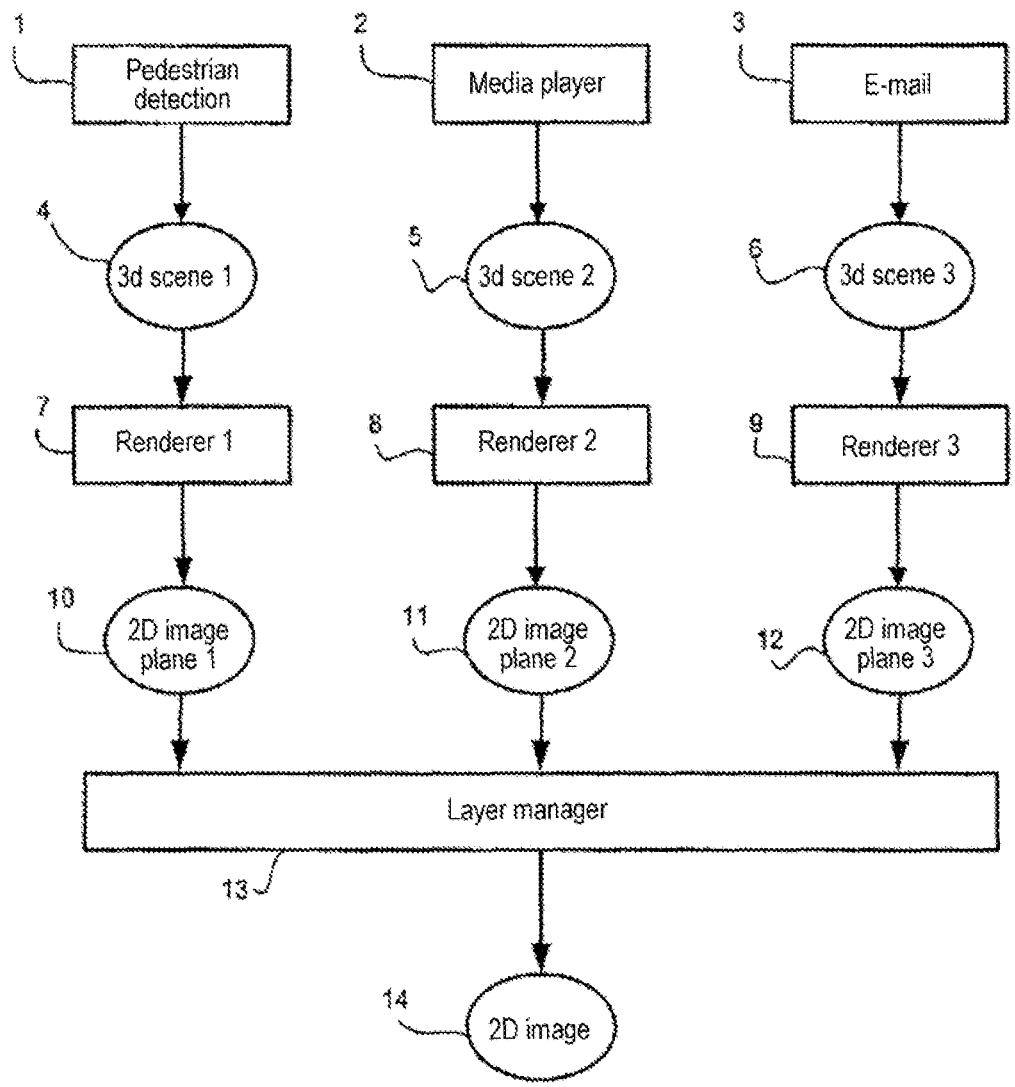
FIG. 1 is a diagram of an image processing architecture according to the prior art.
Figure 2:
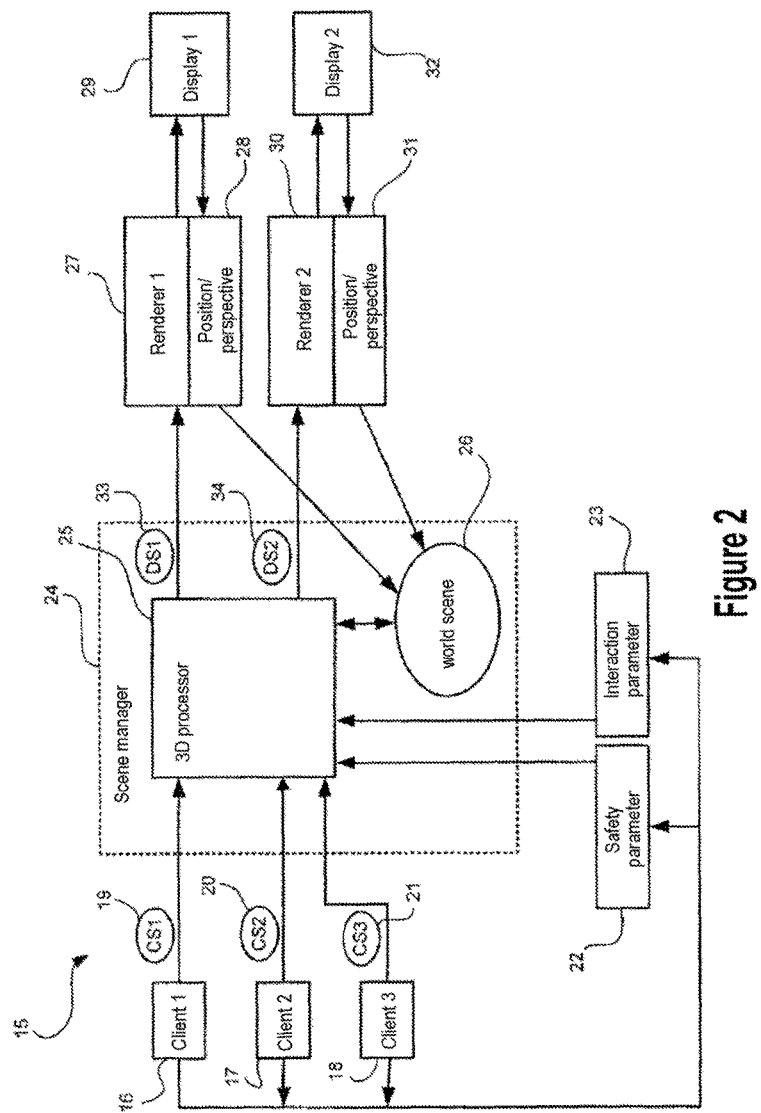
FIG. 2 is a diagram of an image processing architecture according to an embodiment of the invention.

In the image processing architecture 15 illustrated in FIG. 2, 3D image data produced by client-computer program applications 16, 17, 18 are fed to a scene manager 24, which collates the received 3D input image data into a world scene 26 and processes them to 3D output image data for ultimate representation of the image scenes on display devices (displays) 29, 32. To this end, the 3D output image data for the respectively associated display scene 33, 34 are output by the scene manager 24 to two renderers 27, 30, which produce display-specific target image data from the 3D output image data. The renderer 27 produces target image data for the display 29. The renderer 30 produces target image data for the display 32.

In this exemplary embodiment, the image processing system is provided in a motor vehicle. The client application 16 executes a navigation system, the client application 17 executes vehicle-specific functions such as, for example, capturing of a selected gear. The client application 18 is executed in a mobile telecommunication device (smartphone) that is temporarily connected to the vehicle. The client applications 16, 17, 18 in each case produce individual 3D image data for respectively associated 3D image scenes (client scenes) 19, 20, 21. In addition, the client applications 16, 17, 18 in each case produce parameters associated with the 3D image scenes. Safety parameters 22 in each case indicate a priority stage to which extent the associated 3D image scene remains visible when superposed with another 3D image scene. Interaction parameters 23 describe how 3D image objects of the 3D image scene interact with 3D image objects of different 3D image scenes. By way of example, an interaction parameter 23 for a reflectance of a 3D image object indicates how strongly other 3D image objects are reflected by the object. The safety parameters 22 and the interaction parameters 23 can be transmitted by the client applications 16, 17, 18 in each case together or in the client scenes 19, 20, 21 to the scene manager 24. They can also be contained in the world scene 26 and in the display scenes 33, 34.

Both the 3D image data for the 3D image scenes 19, 20, 21 and the parameters 22, 23 are fed to a scene manager 24 for image processing. The scene manager 24 comprises a 3D processor 25 for processing the 3D image data and establishes from the 3D image scenes a whole 3D scene, which is also referred to as world scene 26 here. The different 3D image scenes 19, 20 and 21 can here be superposed on top of each other, with the safety parameters 22 and interaction parameters 23 being applied and/or continued to be associated with the 3D image scenes 19, 20 and 21. When the safety parameters 22 are applied in the 3D processor 25, 3D image data, to which a high value of the safety parameter is associated, are superposed for example on other 3D image data and the result is protected against overwrite in a memory managed by the 3D processor 25 as per the write protection. The application can correspondingly also take place in a renderer 27, 30. The scene manager 24 in the process uses access rules that use the safety parameters 22 to ensure that safety-relevant contents cannot be erroneously overwritten or modified and that safety-relevant scene elements are visible on the respective display 29, 32 after rendering. The 3D processor 25 can be a conventional central processing unit (CPU), on which 3D scenes are processed using a corresponding application, or a dedicated hardware processor for processing 3D scenes, such as for example a graphics processor or a vector processor.

The client applications 16, 17 and 18 and individual processes can contribute in each case graphics contents to the world scene 26 and for their part query which contents are already present in the world scene 26. The scene manager 24 manages the world scene 26 and therefrom derives respective subscenes that it distributes to the renderers 27, 30. In order to form the world scene 26 and the subscenes, the scene manager 24 in each case uses display-specific data 28, 31 that indicate the respective installation position and perspective of the display 29, 32 in the motor vehicle. The data 28, 31 are fed to the scene manager 24 by the respective renderers 27, 30 as parameters. The world scene 26 thus provides a whole 3D scene for all 3D image scenes supplied by the client applications 16, 17 and 18 and including consideration of all the displays 29, 32 thereof In the exemplary embodiment of FIG. 2, the displays 29 and 32 are 2D displays. Accordingly, the renderers 27, 31 render in the manner of a raster processor the 3D output image data they receive into 2D target image data.

Figure 3:
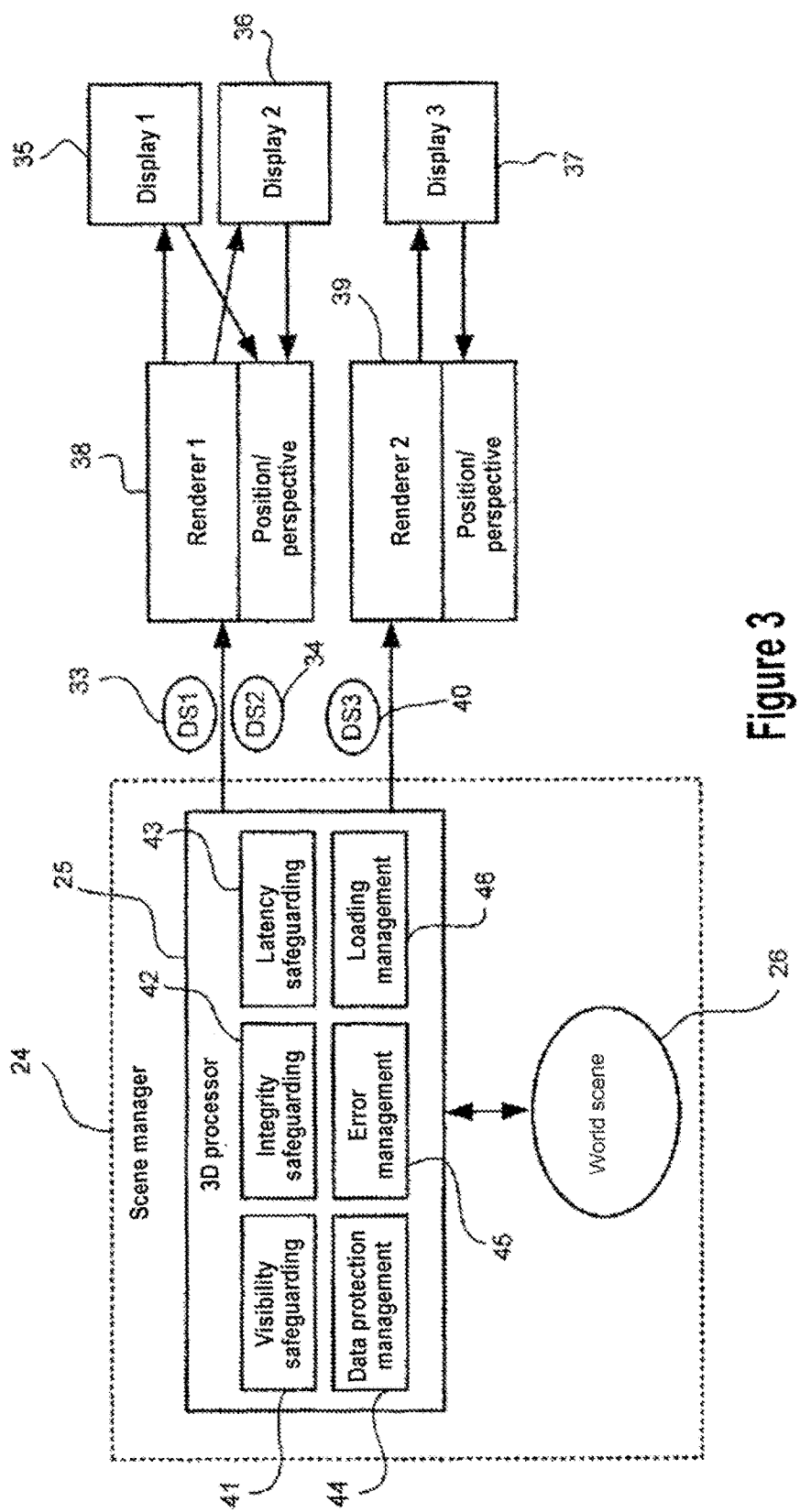
FIG. 3 is a diagram showing details of an image processing architecture.

FIG. 3 shows in more detail the scene manager 24 and output-side components of an image processing system according to an embodiment of the invention. In this system, three displays 35, 36, 37 are provided. Here, the two displays 35, 36 are supplied with target image data from a single renderer 38. The renderer 39 produces target image data from 3D output image data of the display scene 40 only for the one display 37. The renderer 38 manages the parameters for position and perspective for the two displays 35, 36. Conversely, it would also be possible to connect a display to a plurality of renderers, with each of the renderers each producing a partial image of the display. It is also possible in a group of renderers to divide tasks for rendering partial images for one or more displays.

FIG. 3 also illustrates various processes that take place in the 3D processor 25 and that are controlled using parameters that are produced, for example, by a client application 16, 17, 18 or by a display 35, 36, 37 and are notified to the scene manager 24. In process 41, the safety parameters are processed and it is ensured that contents that are safety-relevant are ultimately visible in the respective display. The integrity safeguarding process 42 ensures that specific image contents are ultimately represented in the respective display. To this end, for the respective image contents, a check sum can be formed in the 3D processor and this check sum can be compared to the corresponding check sum of the display. The latency safeguarding process 34 monitors that an image object is displayed within a predetermined time period. This can take place in particular using deferred shading, wherein after a certain time has elapsed, for example 100 ms, a rendering process is interrupted at the next possible process step and the respective image object is displayed immediately on the display. A parameter for this process control can be coupled for example to a safety parameter 22 or to an interaction parameter 23.

The process 44 for data protection management can be used to control that specific 3D image elements and/or 3D image scenes are displayed on specific displays, are displayed in specific display regions or are generally not displayed. This process, too, is parameter-controlled. The process 45 is used for the error management for the processes in the 3D processor. The process 46 for loading management is used to control the processing speed. To this end, for example distribution of the 3D output image data to the renderers 38, 39 can be controlled such that the renderers are uniformly occupied.

Figure 4:
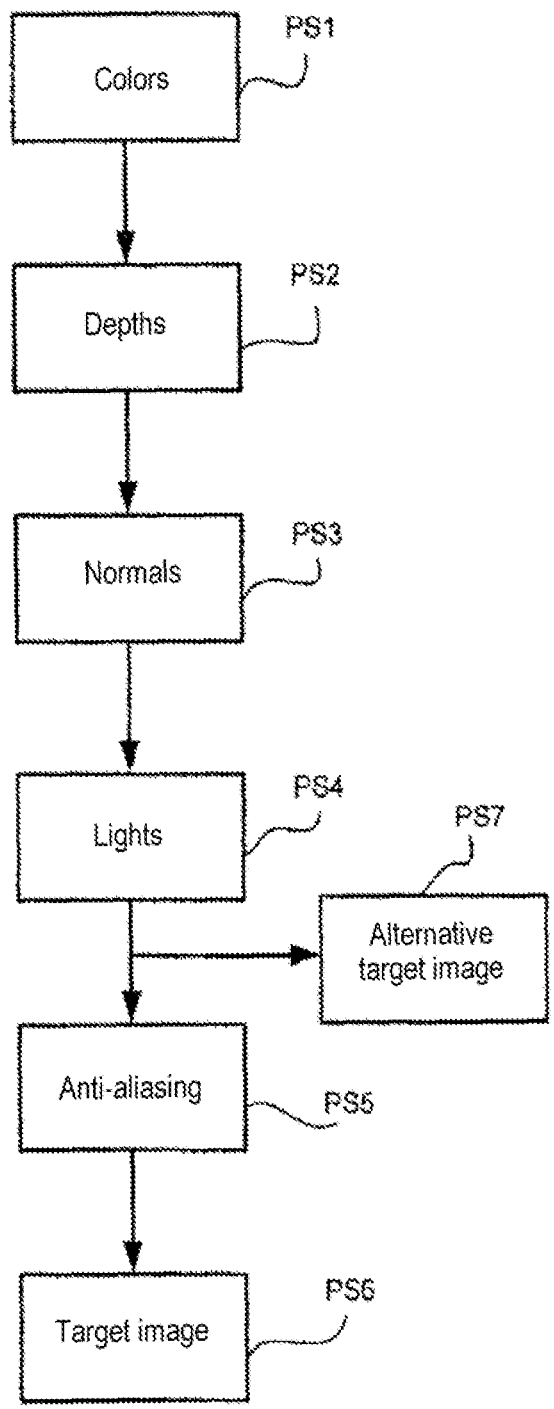
FIG. 4 is a flow chart of a deferred shading process.

FIG. 4 illustrates a deferred shading taking place in a renderer. Here, 3D image data are processed in series in process stages to produce target image data. In the process step PS1, color data of the respective 3D image data are processed. In process step PS2, depth data of the 3D image data are processed. In process step PS3, the respective normals on surfaces of image objects are processed. The process steps PS1, PS2 and PS3 can take place at the same time in one method step. Colors, depths and normals are then the results of this one method step.

In process step PS4, possibly in dependence on any light source present, the brightness values (lights) of the 3D image data are processed. The process steps PS1 to PS4 are necessary to produce a qualitatively sufficient target image. A subsequent process step PS5 serves for smoothing edges (so-called anti-aliasing) of objects, before the intended image processing method is completed by the production of a target image (process step PS6). The process step PS5 is, however, complex in terms of computing. For this reason, it is made possible in a deferred shading operation to interrupt the image processing process after the process step PS4 and to complete it by way of producing an alternative target image (process step PS7) that reproduces at least a certain minimum information content. Additionally or subsequently to the process step PS5, further optional image processing steps can be provided. Further optional endpoints can then be provided between optional steps.

The described devices and system components are controlled in particular using computer programs and can to this end include further generally known elements of computers and digital control apparatuses such as a microprocessor, volatile and non-volatile memories, interfaces and so on. The invention can therefore also be realized as a whole or in part in the form of a computer program product which, during loading and execution on a computer, effects an operation according to the invention entirely or in part. It can be made available for example in the form of a data carrier such as a CD/DVD or in the form of one or more files on a server, from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing 3D input image data for a display of images on at least one display unit, wherein the 3D input image data are provided scene-by-scene in each case in accordance with an associated 3D image scene, the method comprising the acts of:
   receiving the 3D input image data in each case in a scene processing unit for management and processing;
   processing the 3D input image data scene-by-scene in the scene processing unit to generate a plurality of 3D image scenes;
   forming a whole 3D scene by superimposing at least partially two of the plurality of the 3D image scenes and managing the whole 3D scene;
   deriving a plurality of 3D output scenes from the formed whole 3D scene, in which 3D output scenes the superposition takes place in each case in accordance with a perspective viewing location, and wherein 3D output image data are produced in the process; and
   feeding the 3D output image data to at least one rendering unit, which is associated with the at least one display unit, for producing target image data that are adapted to the at least one display unit.

2. The method according to claim 1, wherein:
   a plurality of display units are provided, with which in each case a rendering unit is associated, and
   the scene processing unit produces for the display units in each case different 3D output image data and the 3D output image data are distributed to the one or more rendering units for producing the target image data.

3. The method according to claim 2, wherein:
   the target image data are associated in each case with one display unit, and
   the rendering unit outputs the target image data to the display unit that is in each case associated therewith.

4. The method according to claim 3, wherein:
   the at least one display unit is configured for displaying 2D images, the rendering unit is a raster processor, and the target image data are 2D image data.

5. The method according to claim 1, wherein:
   the at least one display unit is configured for displaying 2D images,
   the rendering unit is a raster processor, and
   the target image data are 2D image data.

6. The method according to claim 1, wherein:
   in each case one of at least two priority stages is associated with the 3D input image data, with a priority stage in each case indicating to what degree the associated 3D image scene remains visible when superposed with another 3D image scene, and
   the 3D output scenes are configured such that, when the target image data are produced in the rendering unit, those target image data that are derived from a 3D image scene of a higher priority stage are superposed at a target image coordinate on target image data that are derived from a lower priority stage.

7. The method according to claim 6, wherein the method is carried out in a vehicle and, using the priority stages and the 3D output scenes, safety-relevant image elements are superposed on other image elements that are not safety relevant on the display unit.

8. The method according to claim 7, wherein the perspective viewing location corresponds to a spatial position of the display unit.

9. The method according to claim 1, wherein the perspective viewing location corresponds to a spatial position of the display unit.

10. The method according to claim 1, wherein
    the scene processing unit uses, for forming the whole 3D scene, interaction parameters that describe an interaction between 3D image elements of at least two of the client-computer systems that provide the 3D input image data.

11. The method according to claim 1, wherein deferred shading takes place in the rendering unit.

12. The method according to claim 1, wherein:
    a predetermined reference image is rendered in parallel with the rendering of the 3D output image data, and
    a decision is made based on a rendering result of the reference image as to whether the rendering result of the 3D output image data is used for further processing or is discarded.

13. The method according to claim 1, wherein the 3D input image data are produced by a client-computer program application in a vehicle.

14. The method according to claim 13, wherein a plurality of client-computer program applications are carried out in the vehicle, which in each case produce individual 3D input image data for respectively associated 3D image scenes and parameters which are respectively associated with the 3D image scenes.

15. The method according to claim 14, wherein the parameters produced by the client-computer program application comprise safety parameters, which in each case indicate a priority stage to which extent the associated 3D image scene remains visible when superposed with a different 3D image scene.

16. The method according to claim 15, wherein the parameters produced by the client-computer program applications comprise interaction parameters which describe how 3D image objects of the 3D image scene interact with 3D image objects of different 3D image scenes.

17. The method according to claim 16, wherein an interaction parameter indicates a reflectance of a 3D image object, and how strongly other 3D image objects are reflected by the 3D image object.

18. The method according to claim 14, wherein the parameters produced by the client-computer program applications comprise interaction parameters which describe how 3D image objects of the 3D image scene interact with 3D image objects of different 3D image scenes.

19. An image processing system, comprising:
at least one controller configured to executed a program for processing 3D input image data for a display of images on at least one display unit, wherein the 3D input image data are provided scene-by-scene in each case in accordance with an associated 3D image scene, the controlling executing the program by:
receiving the 3D input image data in each case in a scene processing unit for management and processing;
processing the 3D input image data scene-by-scene in the scene processing unit to generate a plurality of 3D image scenes;
forming a whole 3D scene by superimposing at least partially two of the plurality of the 3D image scenes and managing the whole 3D scene;
deriving a plurality of 3D output scenes from the formed whole 3D scene, in which 3D output scenes the superposition takes place in each case in accordance with a perspective viewing location, and wherein 3D output image data are produced in the process; and
feeding the 3D output image data to at least one rendering unit, which is associated with the at least one display unit, for producing target image data that are adapted to the at least one display unit.

20. A vehicle, comprising:
at least one display unit;
an image processing system comprising at least one controller for executing a program to process 3D input image data for a display of images on the at least one display unit, wherein the 3D input image data are provided scene-by-scene in each case in accordance with an associated 3D image screen, the controller executing the program by:
receiving the 3D input image data in each case in a scene processing unit for management and processing;
processing the 3D input image data scene-by-scene in the scene processing unit to generate a plurality of 3D image scenes;
forming a whole 3D scene by superimposing at least partially two of the plurality of the 3D image scenes and managing the whole 3D scene;
deriving a plurality of 3D output scenes from the formed whole 3D scene, in which 3D output scenes the superposition takes place in each case in accordance with a perspective viewing location, and wherein 3D output image data are produced in the process; and
feeding the 3D output image data to at least one rendering unit, which is associated with the at least one display unit, for producing target image data that are adapted to the at least one display unit.

* * * * *